United States Patent
Bhogal et al.

(10) Patent No.: US 8,903,768 B2
(45) Date of Patent: Dec. 2, 2014

(54) METHOD AND SYSTEM FOR SYNCHRONIZATION AND MANAGEMENT OF SYSTEM ACTIVITIES WITH LOCALLY INSTALLED APPLICATIONS

(71) Applicant: International Business Machines Corporation, Armonk, NY (US)

(72) Inventors: Kulir Singh Bhogal, Fort Worth, TX (US); Gregory Jensen Boss, Saginaw, MI (US); Rick A. Hamilton, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/668,294

(22) Filed: Nov. 4, 2012

(65) Prior Publication Data

US 2014/0129520 A1     May 8, 2014

(51) Int. Cl.
*G06F 17/30* (2006.01)

(52) U.S. Cl.
USPC .............. 707/623; 707/E17.01; 707/E17.032

(58) Field of Classification Search
CPC .................... G06F 17/30174; G06F 17/17325
USPC ......................................................... 707/623
See application file for complete search history.

(56) References Cited

U.S. PATENT DOCUMENTS

| | | | |
|---|---|---|---|
| 6,654,032 B1 * | 11/2003 | Zhu et al. ....................... 715/753 |
| 7,203,708 B2 | 4/2007 | Lin et al. |
| 7,275,116 B1 | 9/2007 | Hanmann et al. |
| 7,340,534 B2 | 3/2008 | Cameron et al. |
| 7,672,873 B2 * | 3/2010 | Kindig et al. ................. 705/26.1 |
| 7,757,114 B2 | 7/2010 | Watanabe |
| 2002/0083092 A1 * | 6/2002 | Simpson ........................ 707/506 |
| 2002/0140719 A1 * | 10/2002 | Amir et al. ..................... 345/716 |
| 2004/0044691 A1 * | 3/2004 | Wajda ......................... 707/104.1 |
| 2005/0138540 A1 | 6/2005 | Baltus et al. |
| 2005/0197906 A1 * | 9/2005 | Kindig et al. .................... 705/15 |
| 2006/0041686 A1 * | 2/2006 | Caspi et al. .................... 709/248 |
| 2008/0005233 A1 * | 1/2008 | Cai et al. ........................ 709/204 |
| 2008/0154907 A1 | 6/2008 | Prasad et al. |
| 2009/0013045 A1 * | 1/2009 | Maes et al. ..................... 709/205 |
| 2009/0300020 A1 * | 12/2009 | Chen et al. ........................ 707/9 |
| 2010/0010921 A1 * | 1/2010 | Liu et al. .......................... 705/30 |
| 2010/0131523 A1 * | 5/2010 | Yu et al. ......................... 707/756 |
| 2011/0029482 A1 | 2/2011 | Gimson et al. |
| 2011/0029658 A1 | 2/2011 | Werth et al. |
| 2012/0182384 A1 * | 7/2012 | Anderson et al. .......... 348/14.09 |
| 2013/0326576 A1 * | 12/2013 | Zhang et al. .................. 725/133 |

FOREIGN PATENT DOCUMENTS

| | | |
|---|---|---|
| CN | 101567858 B | 4/2011 |
| JP | 2006268838 A | 10/2006 |
| WO | WO 02/054192 * | 7/2002 |
| WO | WO2011161735 A1 | 12/2011 |

* cited by examiner

*Primary Examiner* — Rehana Perveen
*Assistant Examiner* — Robert F May
(74) *Attorney, Agent, or Firm* — David A. Mims, Jr.; Darcell Walker

(57) ABSTRACT

The present invention will enable the user to follow a presentation while waiting for presentation files to download to the user's local machine. This invention provides a dynamic cloud based approach to local hand-off. It will enable users to view a cloud or other remotely-based (found via a URL) or screen-shared version of the presentation until source material has downloaded.

5 Claims, 7 Drawing Sheets

METHOD AND SYSTEM FOR SYNCHRONIZATION AND MANAGEMENT OF SYSTEM ACTIVITIES WITH LOCALLY INSTALLED APPLICATIONS

FIELD OF THE INVENTION

This invention relates to a method and system for accessing and managing information located on a system by a remotely located machine device. In particular, the present invention relates to a method and system for handing-off and synchronizing information located at a remote system location to a local machine. Further, the invention of the present invention relates to an automatic handoff of a presentation from a remote system location to a local machine, wherein the hand-off of the presentation can be from a web-based presentation version to a local machine.

BACKGROUND OF THE INVENTION

Slide presentations are a major form of communicating information to people. These presentations comprise information displayed on one or more slides will verbal communications based on the information displayed on the slides. Historically, those presentations have occurred in front of groups of people at one location. For example, a major component of many seminars and workshops is the slide presentation. The advancements to technology have provided new ways to use slide presentations to convey information to people. The Internet has initiated new ways for people to communicate and exchange information.

One activity resulting from technology advancements has been web-conferencing. Web conferencing is a procedure that allows conferencing events to be shared with multiple remote locations. This procedure and format allows real-time point-to-point communications between parties. In addition, web-conferencing provides for multicast communications from one sender to many receivers. Web-conferencing technology also offers information of text-based messages, voice and video chat to be shared simultaneously, across geographically dispersed locations. Applications for web conferencing include meetings, training events, lectures, or short presentations from any computer.

FIG. 1 illustrates a general configuration for a web-based conference or seminar. This process begins with the creation of a presentation that usually contains some audio and visual elements such as slides. The creator/presenter 100 uploads this presentation to a host provider location 102. This heat provider can be a server device located on a network that is remote from the presenter and from those who will eventually view the presentation. Common names for this type of presentation in this format include web-conferencing and web-seminar ("webinar"). In implementation, the presenter 100 announces the activity and invites persons to attend. At the time of the activity, the presenter 100 accesses the presentation at the hosting provider 102. The attendees 104, 106, 108 and 110 also access the hosting provider to view the presentation. In the current webinar configuration, the presenter has access to and controls the presentation. The attendees access the hosting provider and view the presentation. The attendees have no control over the visual information presented. In some configurations, the attendees can ask questions of the presenter. When an attendee asks a question, the presenter can stop the presentation and answer the question. As shown in FIG. 1, the presenter 100 has the ability to transmit to and receive information from the hosting provider 102. However, as also shown, the attendees can only access and view information from the hosting provider.

During a webinar, the attendees can view the slides from the hosting provider. In another arrangement, the attendees can download the presentation to their local machine and view the presentation as it is occurring. However, currently, attendees who want to download the presentation files have to wait for files to be downloaded to their computers to follow along with a presentation. When this occurs, the speaker/presenter has to wait and initiate small talk to fill the time while attendees wait for the completion of the downloaded files. Although as previously discussed, presenters may offer a web-based version of the presentation, however, many users prefer to use locally installed applications for improved performance and to enable them to mark up (make specific notes) the slides during the presentation.

There remains a need for a method and system to enable a hybrid presentation that accommodates web presentation combined with efficient installation of a local copy.

SUMMARY OF THE INVENTION

In this invention, an automatic hand-off of a presentation is accomplished. This hand-off may be from a web-based version to a locally installed, once the version is completely or sufficiently downloaded. For example, the presentation recipient may view a screen-shared version of a presentation while the source file is being downloaded to her machine. Once the file arrives on her computer, she is automatically switched from the web version to the local one, such that bandwidth concerns about rendering are no longer problematic.

This invention enables the smooth transition from a web presentation to a locally installed one. When the source file is downloaded hand-off is automatically done from the screen sharing to local application. The local version is opened at the point where the web version left off. This invention may apply to multiple types of data transfer, including documents, streaming video and other software as a service applications.

DETAILED DESCRIPTION OF THE INVENTION

This system of the present invention will enable the user to follow a presentation while waiting for presentation files to download to the user's local machine. This invention provides a dynamic cloud based approach to local hand-off. It will enable users to view a cloud or other remotely-based (found via a URL) or screen-shared version of the presentation until source material has been downloaded.

Figure 1:
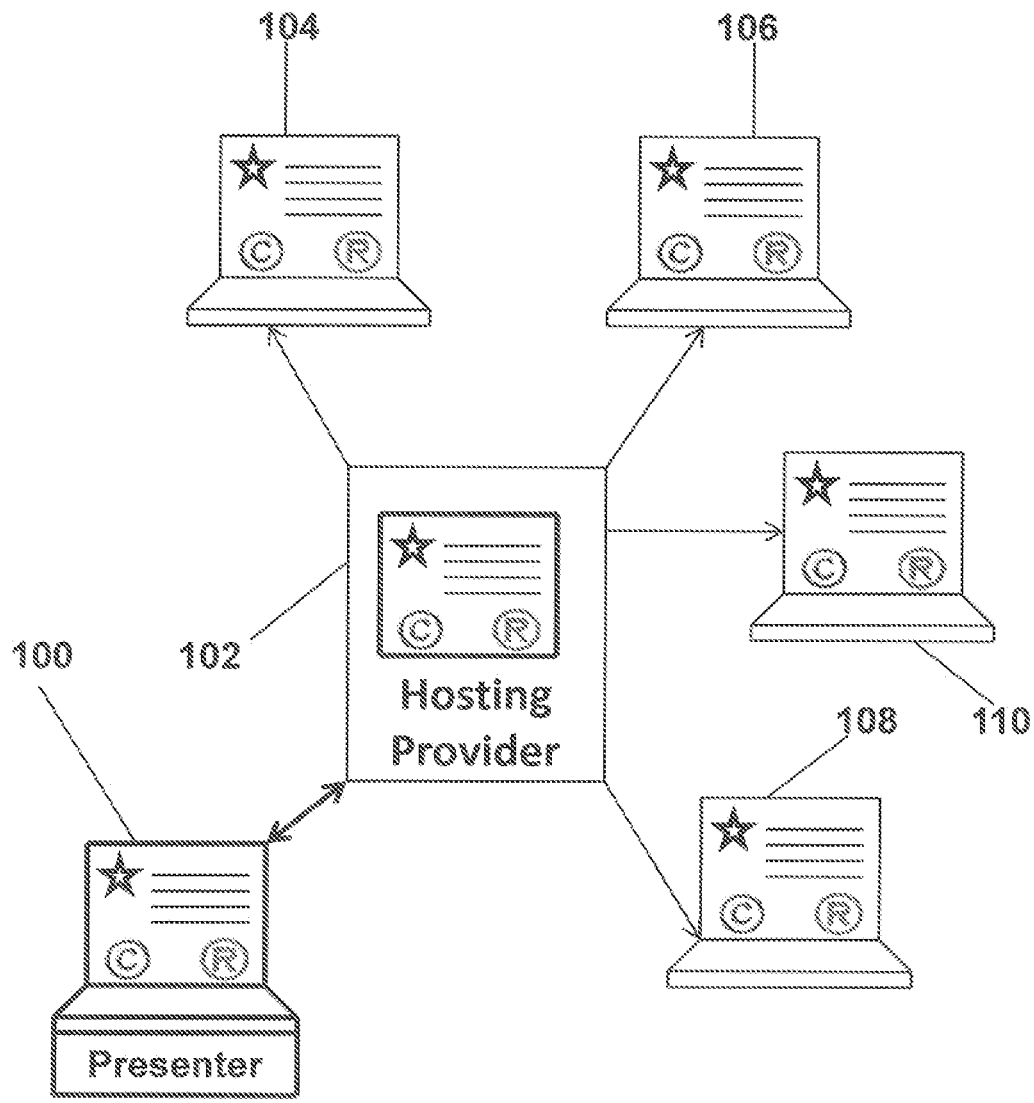
FIG. 1 is a view of a configuration of a conventional web-conferencing event.
Figure 2:
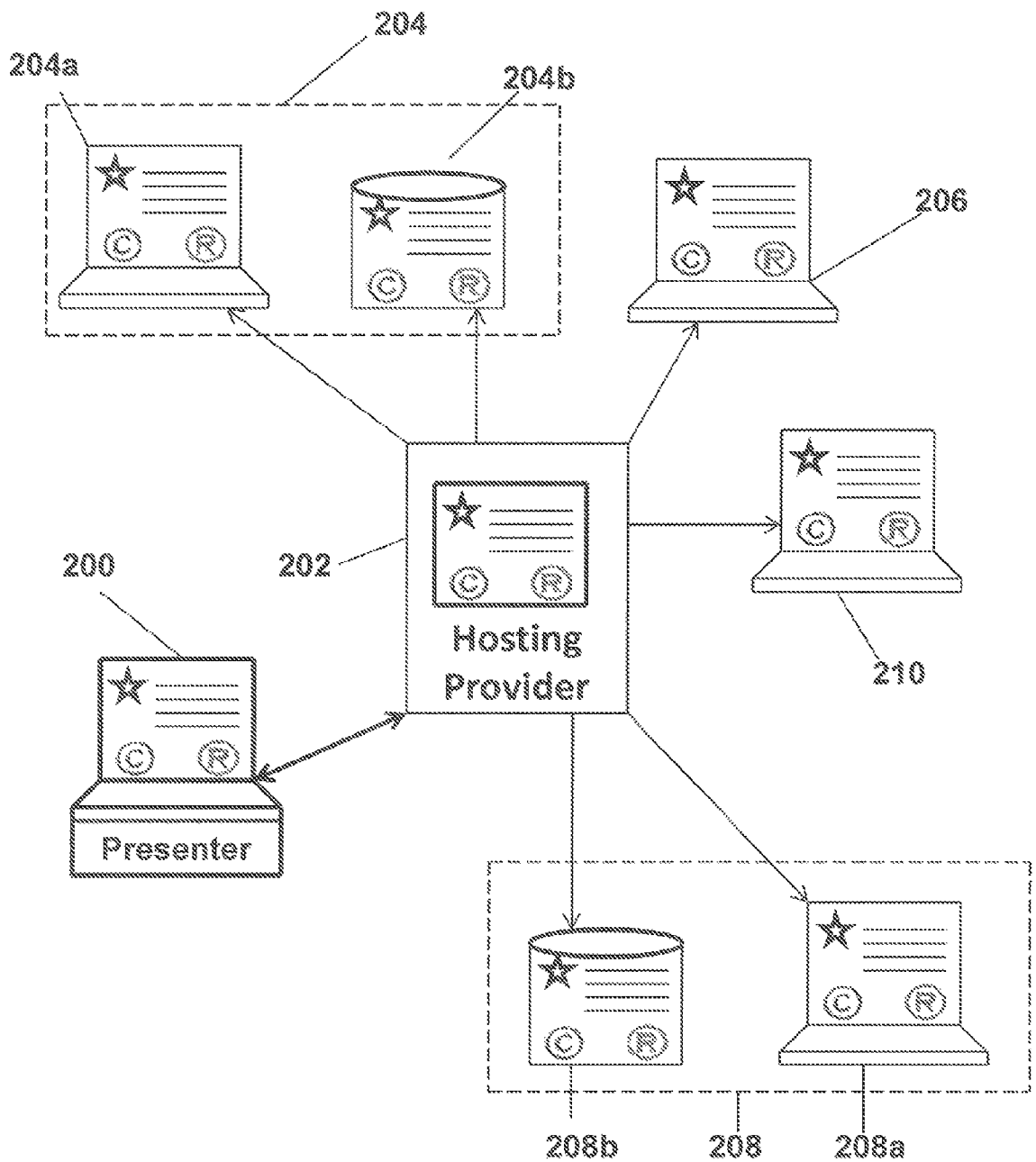
FIG. 2 is a view of a configuration of a web-conferencing event in which an attendee views the displayed information while the information is being downloaded to the attendees local machine.

Referring to FIG. 2, shown is a configuration of the system of the present invention in which a presenter 200 is in communication with the hosting provider 202 and begins to conduct a presentation. As mentioned, the presenter has the ability to remotely control the presentation at the hosting provider 202. The user attendees connect to the hosting provider to access the presentation. In this configuration, two of the attendees (206 and 210) are viewing the presentation in a conventional manner. Attendees (204 and 208) are viewing the presentation by implementing the method and system of the present invention. As shown, attendee 204 comprises a computing device 204a and a memory device 204b. The same shows for attendee 208. Both the computing device 204a, 208a and the memory device 204b, 208b are directly connected to the hosting provider 202. At the initiation of the presentation, the presentation content is being viewed on the computing device 204a while it is also being stored on the memory device 204b. Once the download of the contents is complete, the present invention will synchronize the downloaded presentation with the current location of the presentation at the hosting provider. This synchronizing action is part of the formal hand-off of the presentation from the hosting provider to the local user. At this point, the user can begin viewing presentation contents from the presentation file stored in the memory device 204b.

Figure 3:
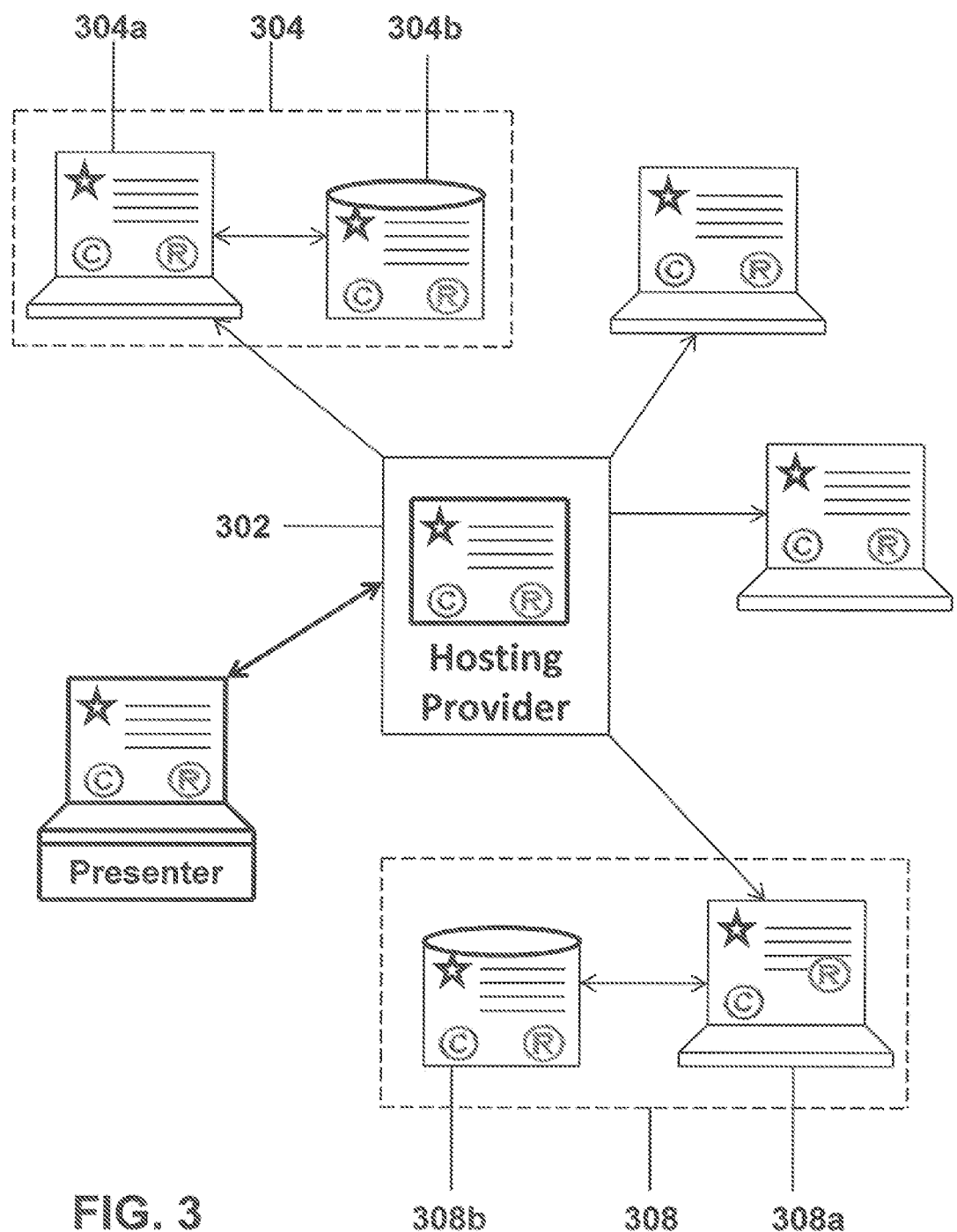
FIG. 3 is a view of a configuration of a web-conferencing event in which an attendee views the displayed information on the attendee's local machine.

FIG. 3 shows a configuration of the present invention wherein an attendee 304 is viewing a downloaded presentation file of the presentation stored in the memory device 304b from the computing device 304a. The computing device 304a is in communication with the memory device 304b and with the hosting provider 302. The user will view the presentation file stored on the memory device on the computing device. The user will listen to the audio of the presentation directly from the hosting provider.

Figure 4:
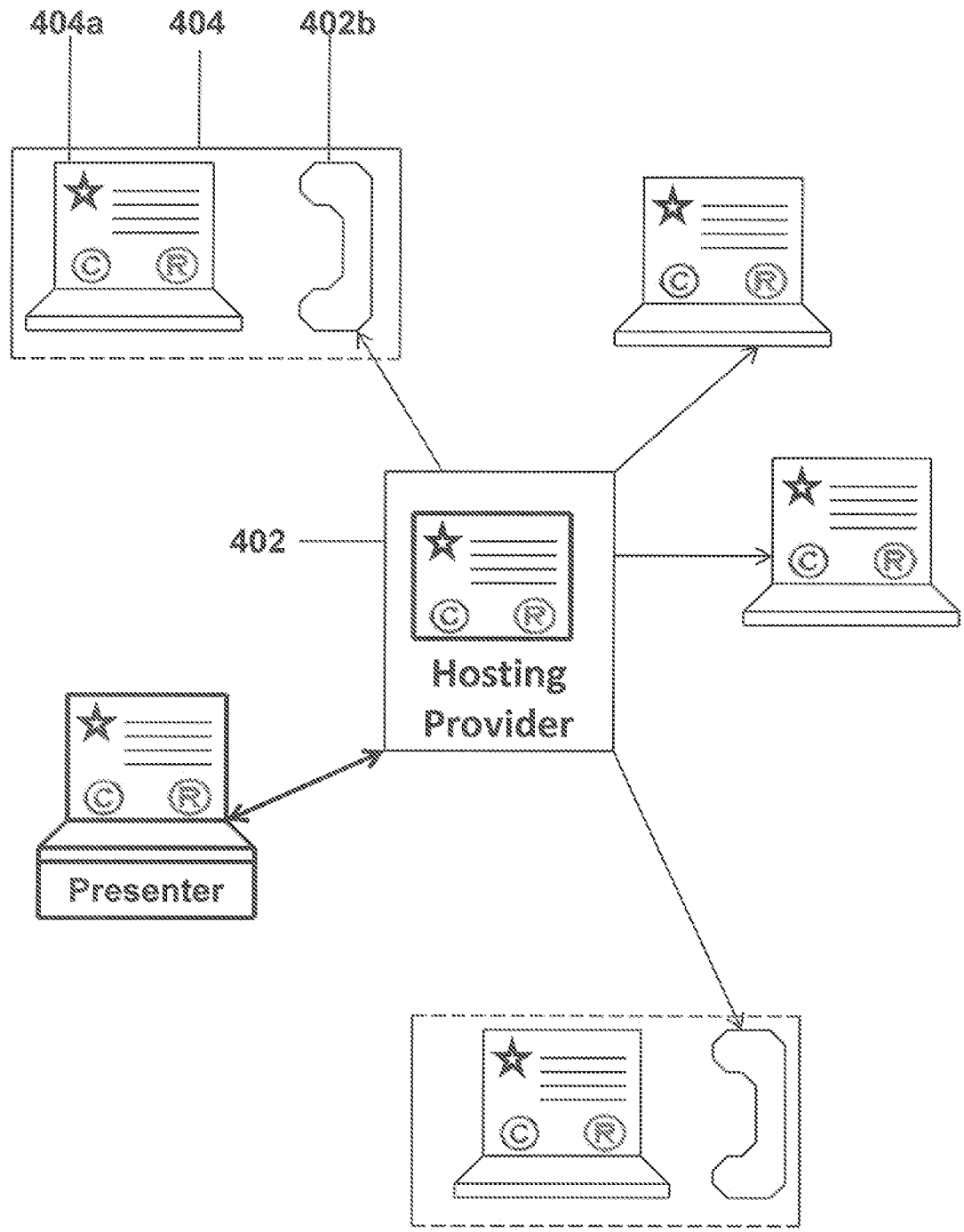
FIG. 4 is a view of a configuration of a web-conferencing event in which an attendee views the displaying information on the attendees local machine, while accessing presentation audio from another device.

In most configurations, the memory device and the computing device are the same physical device. Further, when viewing many of these online/webinar presentations, the user is located at some stationary location. However, with the active lives of many individuals, there can be situations when a user does not have time to sit at one location and view an entire presentation. FIG. 4 is a configuration wherein a user can view a presentation while traveling. The user 404 will initially download the presentation file from the hosting provider 402 to a local storage location. In this configuration, the local storage device is in the computing device 404a. As mentioned, once the presentation file is downloaded to the local memory/machine 404a, the presentation is automatically synchronized to the currently slide location of the presentation. The user can incorporate a second electronic device to access the hosting provider 402. The second user device can be any device that will enable access to the audio portion of the presentation. Once the user has established an audio connection to the hosting provider 402, the user can listen to the presentation while viewing the presentation information. For example, with this configuration, a user can view a real-time presentation while riding a motor vehicle.

Figure 5:
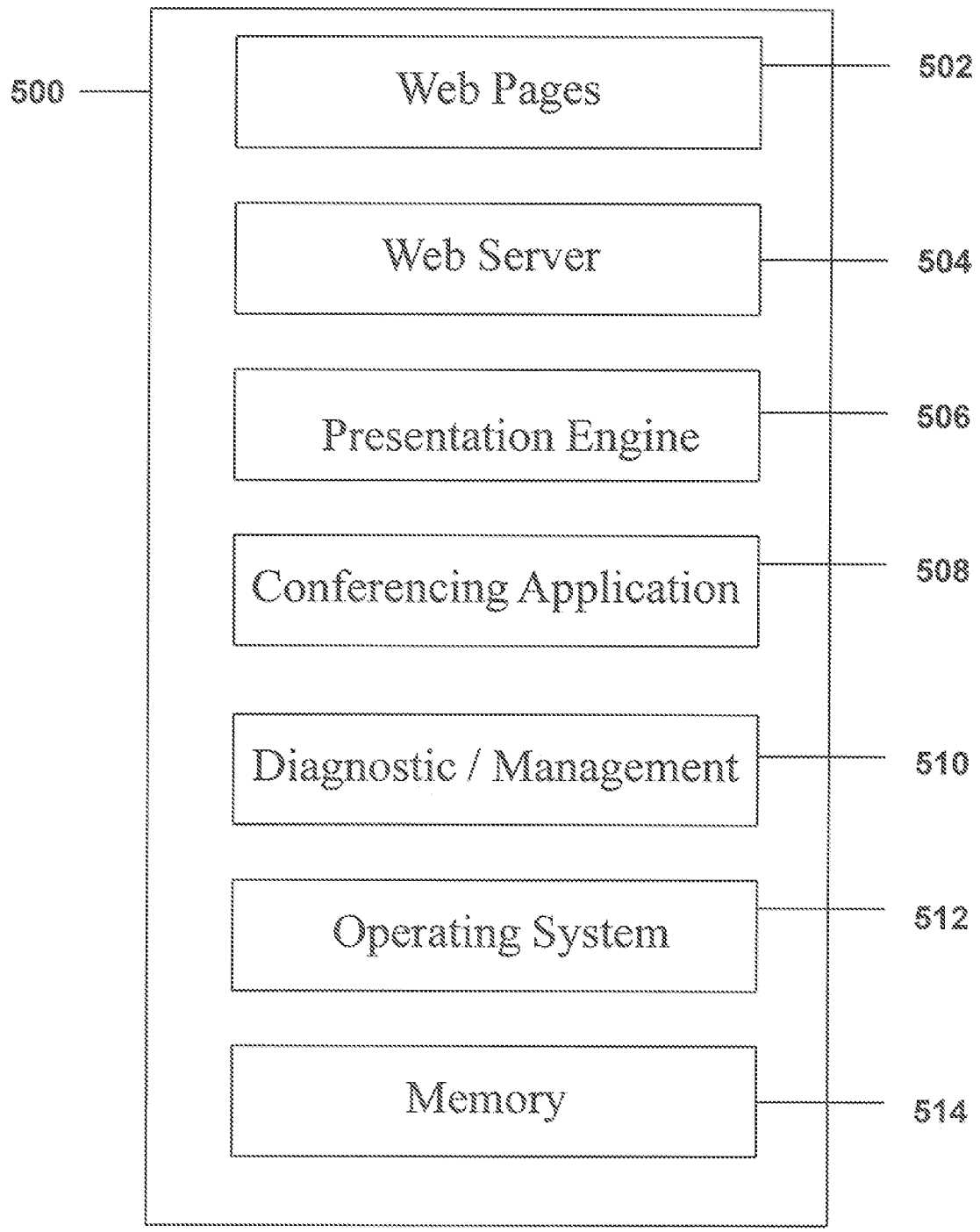
FIG. 5 is a view of the components of a web-hosting provider.

FIG. 5 illustrates basic components of the hosting provider device. As mentioned, the hosting provider can be a server machine located on a communication network. Presenters would upload their presentations to the hosting provider. Users would access the hosting provider to view the presentations and download presentations to local user machines. The hosting provider 500 can also be a configuration of components that form a hosting system. As illustrated, this hosting provider 500 can comprise a series of web pages 502 and a web server 504. A presentation engine 506 and conferencing applications 508 are the main components to facilitate the presentation options and functions of the present invention. The diagnostic and management module 510 ensures that the hosting provider continues to properly function. The operating system 512 and the memory 514 are basic components of an computing system.

Figure 6:
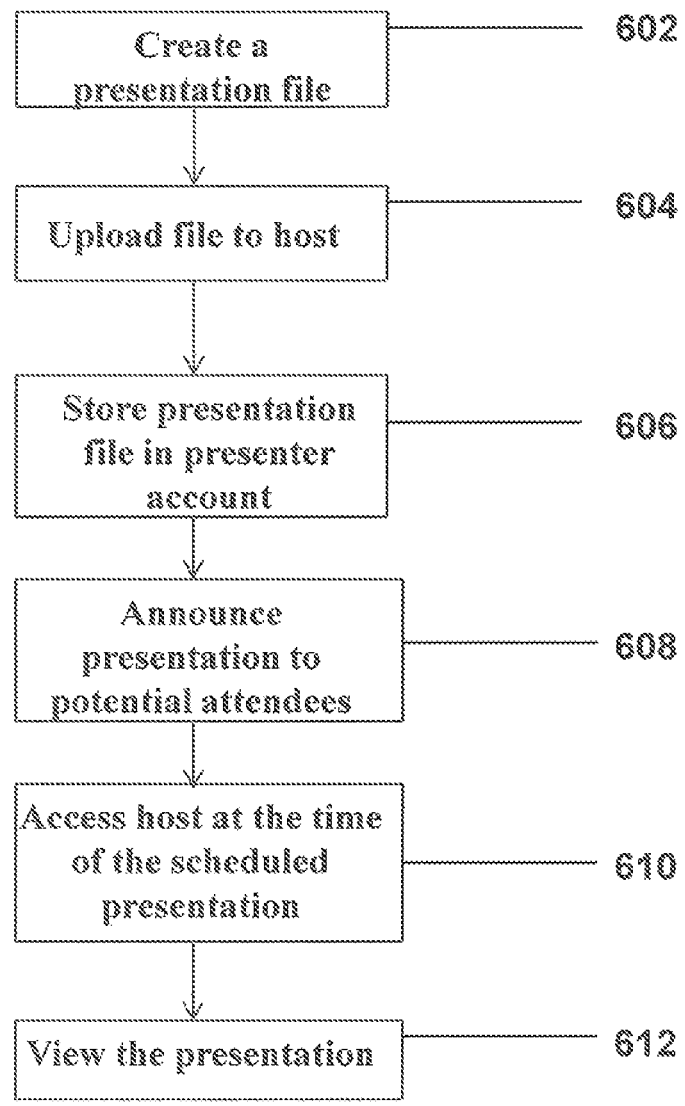
FIG. 6 is a general flow diagram of the steps in viewing an online presentation.

The present invention comprises a system and a method bar synchronization and management of system activities with locally installed applications. FIG. 6 illustrates flow diagram of the general steps in creating a presentation and viewing the presentation from the hosting provider. In step 602, a presenter prepares a presentation and creates a presentation file. This presentation file could be a PowerPoint type file with multiple slides containing presentation information. After completion of the creation of the presentation file, the presenter uploads the presentation file to the host provider in step 604. The host stores the presentation file in an account for that particular presenter. This file storage activity occurs in step 606. Before actual presentation, in step 608 announcement of the presentation is sent out to potential attendees. The presentation announcement contains information about the presentation topic, presentation time and presentation access information. At the presentation, the presenter and attendees who chose to view the presentation will access the hosting provider in step 610. In step 612, the presentation begins with the presenter in control and presenting the information to the attendees. The attendees access the presentation and view the presentation from their local computing machines.

Figure 7:
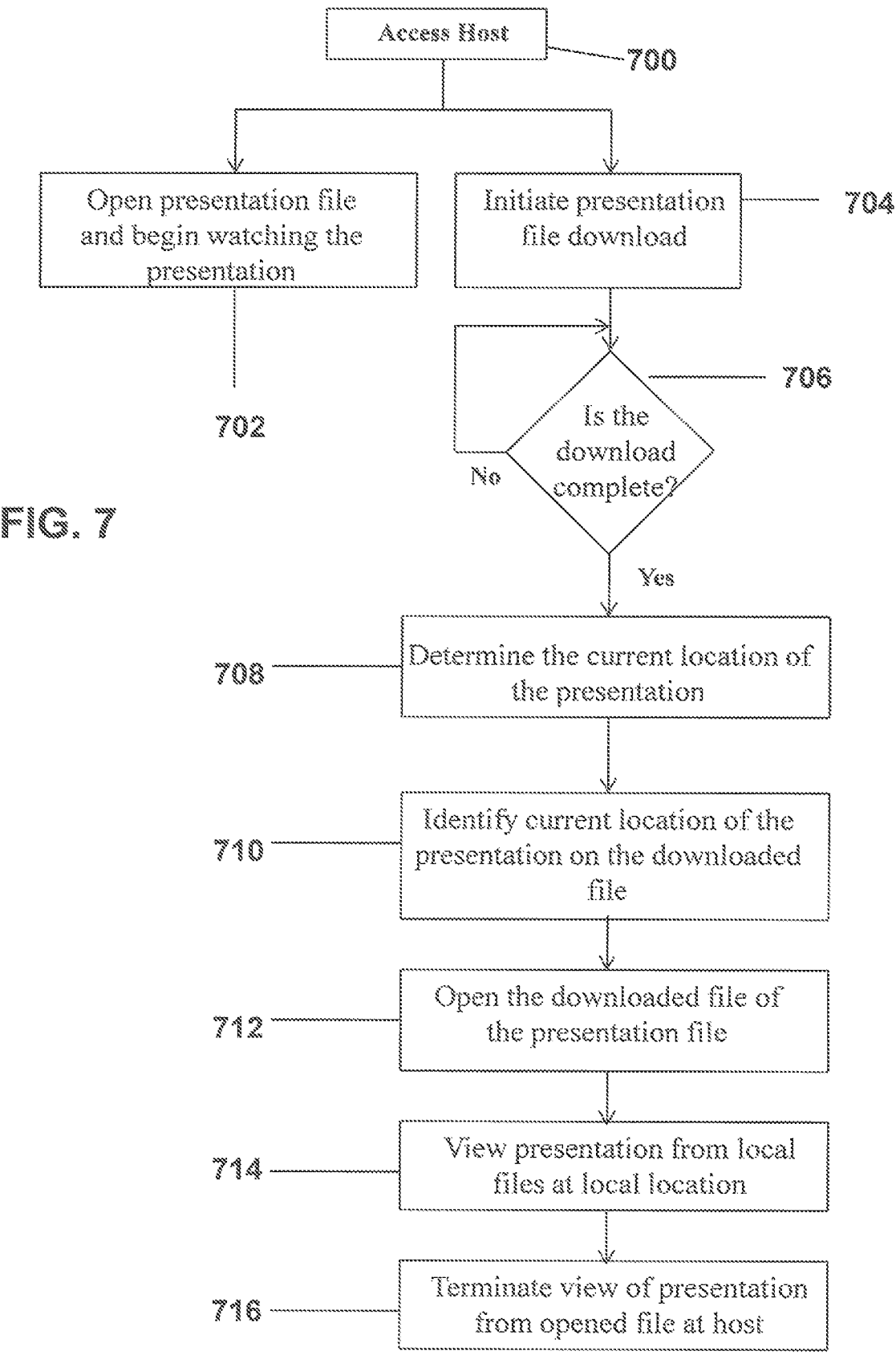
FIG. 7 is a flow diagram of the steps in the implementation of the method of the present invention.

FIG. 7 is a flow diagram of the steps in the implementation of the method of the present invention. This method illustrates the downloading of a presentation file to an attendee's local machine while enabling the attendee to continuously view the presentation at the hosting provider during the downloading process. The steps in FIG. 7 continue the process from the end of the method of FIG. 6. In the initial step 700, the user/attendee accesses the hosting provider. In step 702, the attendee begins to view the presentation at the hosting provider from a local computing device. The user can also choose to download the presentation to his/her local computing device. If the user wants to perform a download of the presentation, in step 704, the user initiates a presentation file download. A key feature of the present invention is that the user can continue to view the presentation from the hosting provider while the presentation file download of step 704 is occurring. In past systems, the user had to wait until the completion of the download to view the presentation. In addition, as previously mentioned, a presenter would also have to wait on the completion of the download in order to allow the user to keep up with the presentation. As the download is occurring, stop 706 periodically checks the download process to determine if the download has completed. If during a download check, the determination is that the download has not completed, the method remains at step 706 where the checking continues.

Once the download of the presentation file to the user's local machine is complete, the method moves to step 708. This step is the beginning of the synchronization process, which synchronize the downloaded presentation on the user's local device with the current location of the ongoing presentation. In step 708 there is a determination of the current location of the presentation. For example, there is a determination of which slide of the presentation is currently being shown on the presentation. Once there has been a determination of the location of the current presentation, step 710 identifies that location on the downloaded presentation. For example, a determination is that the presentation is on slide number 7. In step 710, the method will identify slide number 7 in the downloaded presentation on the users local computing machine. At this point, step 712 will open the downloaded presentation file to the identified file location. In step 714, the user then begins to view the presentation from the local computing machine. Step 716 then terminates the presentation view from the hosting provider. The initiation of the viewing of the presentation at the local user machine and the terminating of the access to the presentation from the hosting provider serve as the hand-off process of the present invention. Once the user begins to view the presentation from the local machine, an optional feature will enable the slides of the presentation to automatically change as the presenter changes the slides on the presentation at the hosting provider.

The present invention may apply to both:
  A new presentation which the user did not previously have stored on his local computer but is now acquiring.
  The situation where the user already has an outdated version of the file on his local computer and needs to watch the presentation live while the updates are automatically installed.
Versioning to synch local copy with cloud copy
  1. Version each of the slides with a unique ID until they are saved or modified
  2. User has a deck that is 2 versions old that a 80% accurate
  3. Automatically detect the 20% of slides that are out of date
  4. Retrieve only the out of date slides from the cloud and insert into file
  5. Prefer the use of the local file when it is up to date. When it is not, use the remote version.

A user is flipping through a local copy of a presentation deck. As he does so, this invention monitors deviations between the local copy and a remote copy. When the user gets to a certain slide, a discrepancy is detected, and the most recent version of this slide is downloaded from the remote site. This permits the local copy to be updated with the latest version.

While users present the slide show inside PowerPoint, the audience follows along in their browser. The presenter of a Microsoft PowerPoint presentation can put others into slave mode so they move in synch. Document management programs offer version management within documents.

It is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution. Examples of computer readable storage media include media such as EPROM, ROM, tape, paper, floppy disc, hard disk drive, RAM and CD-ROMs.

We claim:

1. A system for downloading files from a remote system location to a local computing machine and synchronizing and managing of system activities, at the remote system location related to the downloaded files, at the local machine comprising:
  a hosting provider at a remote location, said hosting provider being accessible by a user and containing downloadable files for viewing by the user;
  a plurality of local user computing machines for establishing communication with said hosting provider and enabling users to download and view files from said hosting provider; and
  a plurality of software presentation file management modules, one of each said plurality of presentation file management modules being located in each of said plurality of local user computing machines, said software module capable of:
    identifying a presentation file being displayed at a system hosting provider and a user viewing the presentation file via the system hosting provider;
    determining whether a user viewing files contained at a system hosting provider desires to view these same files at a local user computing machine;
    initiating a file download process of the presentation file from the system hosting provider to the local user computing machine while simultaneously continuing to view the presentation file at the system hosting provider;
    determining when the download of the presentation file has completed;
    synchronizing the downloaded presentation file at the local user computing machine with the presentation file located at the system hosting provider;
    automatically transferring user access to the presentation file from the presentation file at the system hosting provider to the downloaded presentation file at the local user computing machine;
    terminating the user's access to the presentation file at the system hosting provider; and
    opening the downloaded file at the local user computing machine at the point that matches a point of the file at the system hosting provider when the termination of the file at the system hosting provider occurred.

2. The system for downloading files from a remote system location to a local user computing machine as described in claim 1 wherein said local user computing machine comprises a computing device connected directly to said hosting provider for viewing a presentation file while the presentation is being downloaded to said local computing device and a memory device separately connected to said hosting provider for receiving and storing the downloaded presentation file.

3. The system for downloading files from a remote system location to a local computing machine as described in claim 1 wherein said local user machine comprises a software module capable of opening the downloaded file of the presentation at the user's local computing machine; and simultaneously terminating access by the user to the presentation accessed at hosting provider containing files for viewing.

4. The system for downloading files from a remote system location to a local computing machine as described in 1 wherein a software presentation file management module further comprises the capability to determine when a file download to the local user computing machine is complete, and then synchronizing the downloaded file at the local user computing machine with the file located at the hosting provider.

5. The system for downloading files from a remote system location to a local user computing machine as described in 4 wherein a software presentation file management module further comprises the capability to adjust a presentation file at the local user computing machine so that a current slide being displayed at the local user computing machine is the same as a corresponding slide currently being displayed at the system host provider.

\* \* \* \* \*